United States Patent
Choi et al.

(10) Patent No.: US 11,102,241 B2
(45) Date of Patent: *Aug. 24, 2021

(54) APPARATUS AND METHOD FOR PERFORMING OPERATION BEING SECURE AGAINST SIDE CHANNEL ATTACK

(71) Applicant: SAMSUNG SDS CO., LTD., Seoul (KR)

(72) Inventors: Kyu-Young Choi, Seoul (KR); Duk-Jae Moon, Seoul (KR); Hyo-Jin Yoon, Seoul (KR); Ji-Hoon Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 186 days.

This patent is subject to a terminal disclaimer.

(21) Appl. No.: 16/160,357

(22) Filed: Oct. 15, 2018

(65) Prior Publication Data

US 2019/0327264 A1  Oct. 24, 2019

(30) Foreign Application Priority Data

Apr. 24, 2018  (KR) .................. 10-2018-0047459

(51) Int. Cl.
*H04L 29/06* (2006.01)
*H04L 29/08* (2006.01)
*H04L 12/26* (2006.01)

(52) U.S. Cl.
CPC ...... *H04L 63/1466* (2013.01); *H04L 63/1416* (2013.01)

(58) Field of Classification Search
CPC ... G06F 21/755; H04L 63/1466; H04L 9/003; H04L 9/3013; H04L 63/1416

(Continued)

(56) References Cited

U.S. PATENT DOCUMENTS 5,204,829 A * 4/1993 Lyu ..................... G06F 7/57
                                                      708/500
5,973,705 A * 10/1999 Narayanaswami ..... G06F 7/535
                                                      345/505

(Continued)

FOREIGN PATENT DOCUMENTS

WO    2016/094195 A2    6/2016

OTHER PUBLICATIONS

International Search Report (PCT/ISA/210) dated Feb. 13, 2019 issued by the International Searching Authority in International Application No. PCT/KR2018/012927.

*Primary Examiner* — Haresh N Patel
(74) *Attorney, Agent, or Firm* — Sughrue Mion, PLLC

(57) ABSTRACT

An apparatus and method for performing an operation which are secure against side-channel attack are provided. According to one embodiment of the present disclosure, the apparatus includes a first outputter configured to output a first output value corresponding to a seed value using a first parameter candidate value set, a second outputter configured to output a second output value using a second parameter candidate value set wherein the second output value corresponds to the seed value and is capable of being generated using the first output value, a third outputter configured to output a third output value using the seed value and the first output value, and a fourth outputter configured to output a fourth output value using the second output value and the third output value, wherein the fourth output value is capable of being generated using the seed value.

12 Claims, 10 Drawing Sheets

(58) Field of Classification Search
USPC .......................................................... 726/23
See application file for complete search history.

(56) References Cited

U.S. PATENT DOCUMENTS

| | | | |
|---|---|---|---|
| 7,783,043 B1* | 8/2010 | Dondeti | H04L 63/062 380/278 |
| 2003/0018676 A1* | 1/2003 | Shaw | G06F 7/5443 708/501 |
| 2006/0288070 A1* | 12/2006 | Vadi | G06K 9/00986 708/524 |
| 2008/0019504 A1* | 1/2008 | Han | H04L 9/0631 380/28 |
| 2010/0100748 A1* | 4/2010 | Hubert | H04L 9/003 713/189 |
| 2010/0223478 A1 | 9/2010 | Ebeid et al. | |
| 2011/0002461 A1* | 1/2011 | Erhart | G06F 21/34 380/44 |
| 2011/0040817 A1* | 2/2011 | Lazich | H04L 9/0637 708/251 |
| 2011/0040822 A1* | 2/2011 | Eichenberger | G06F 9/30014 708/607 |
| 2011/0239002 A1* | 9/2011 | Beckmann | G06F 9/455 713/189 |
| 2011/0246119 A1* | 10/2011 | Feix | G06F 21/755 702/117 |
| 2011/0246789 A1* | 10/2011 | Feix | G09C 1/00 713/190 |
| 2012/0011348 A1* | 1/2012 | Eichenberger | G06F 9/30014 712/222 |
| 2012/0057695 A1* | 3/2012 | Lazich | G06F 7/728 380/28 |
| 2012/0191767 A1* | 7/2012 | Anderson | G06F 13/366 708/497 |
| 2012/0314867 A1* | 12/2012 | Tomaru | H04L 9/08 380/270 |
| 2012/0316689 A1* | 12/2012 | Boardman | H02J 13/0079 700/292 |
| 2013/0007573 A1* | 1/2013 | Radhakrishnan | H03M 1/1052 714/807 |
| 2013/0016830 A1 | 1/2013 | Ebeid | |
| 2013/0179691 A1 | 7/2013 | Naito et al. | |
| 2013/0182839 A1 | 7/2013 | Vuillaume | |
| 2013/0346463 A1* | 12/2013 | Hilker | G06F 7/483 708/620 |
| 2014/0041040 A1* | 2/2014 | Potkonjak | G06F 21/64 726/26 |
| 2015/0222421 A1* | 8/2015 | Guo | G09C 1/00 380/28 |
| 2015/0236853 A1* | 8/2015 | Fischer | G06F 7/588 380/46 |
| 2016/0065361 A1* | 3/2016 | Choi | H04L 9/0631 380/287 |
| 2016/0112189 A1* | 4/2016 | Tomaru | H04K 1/02 380/268 |
| 2017/0302444 A1 | 10/2017 | Gillaspy | |

* cited by examiner

FIG. 10 seed = | 11111110000000100000000 ··· 00000010111111111111110 | ~1000

⇩

32 blocks

| 11111110 | 00000010 | 00000000 | ··· | 00000010 | 11111111 | 00000000 |

| j \ i | 1 | 2 | 3 | ··· | 30 | 31 | 32 |
|---|---|---|---|---|---|---|---|
| 00000000 | $k_{1,1}$ | $k_{1,2}$ | $k_{1,3}$ | ··· | $k_{1,30}$ | $k_{1,31}$ | $k_{1,32}$ |
| 00000001 | $k_{2,1}$ | $k_{2,2}$ | $k_{2,3}$ | ··· | $k_{2,30}$ | $k_{2,31}$ | $k_{2,32}$ |
| 00000010 | $k_{3,1}$ | $k_{3,2}$ | $k_{3,3}$ | ··· | $k_{3,30}$ | $k_{3,31}$ | $k_{3,32}$ |
| ⋮ | ⋮ | ⋮ | ⋮ | ⋮ | ⋮ | ⋮ | ⋮ |
| 11111110 | $k_{255,1}$ | $k_{255,2}$ | $k_{255,3}$ | ··· | $k_{255,30}$ | $k_{255,31}$ | $k_{255,32}$ |
| 11111111 | $k_{256,1}$ | $k_{256,2}$ | $k_{256,3}$ | ··· | $k_{256,30}$ | $k_{256,31}$ | $k_{256,32}$ |

~1010

APPARATUS AND METHOD FOR PERFORMING OPERATION BEING SECURE AGAINST SIDE CHANNEL ATTACK

CROSS-REFERENCE TO RELATED APPLICATION(S)

This application claims the benefit under 35 USC § 119(a) of Korean Patent Application No. 10-2018-0047459, filed on Apr. 24, 2018, in the Korean Intellectual Property Office, the entire disclosure of which is incorporated herein by reference for all purposes.

BACKGROUND

1. Field

The following description relates to a technology for side-channel attack prevention.

2. Description of Related Art

Generally, mathematical operations (exponentiation operation, multiplication, addition, etc.) used in key exchange, encryption, digital signatures, etc. are performed on very large numbers, and hence they are implemented using a big number library that can perform these operations. However, when such an implementation goes wrong, not only will an erroneous operation result be output, but also a security vulnerability may arise in the case of an operation required for encryption and security, which may cause a serious problem. For these reasons, the National institute of Standards and Technology (NIST) has introduced Federal Information Processing Standards (FIPS) certification for authenticating cryptographic modules to verify accuracy and safety of implementation of an operation required for encryption.

A test method for such certification is carried out in a manner that, for example, a plurality of valid and correct exponent values (x) and exponentiation values ($g^x$) are obtained, a plurality of x values are input to a target to be certified, and whether a correct $g^x$ value is output is checked.

Meanwhile, as Internet of Things (IOD) devices evolve, there is a growing risk of side-channel attacks that gain important information by exploiting physical information leaked from devices during a key exchange for encryption, and mathematical computations for an encryption, and a digital signature.

A side-channel attack is an attack that obtains secret information using a leakage of side-channel information (e.g., power consumption, the amount of electromagnetic radiation, algorithm execution time, etc.) for computations performed during an operation of an algorithm for key exchange, encryption, digital signature, etc.

A power analysis attack, which is a form of side-channel attack, is known as the most powerful side-channel attack, and equipment for power analysis attacks is also known as a very effective attack means because of high probability of realization with low cost. Thus, the power analysis attack is a field in which the most research is being currently conducted. A method of such a power analysis attack largely includes simple power analysis (SPA), differential power analysis (DPA), collision attack (CA), and the like.

Methods that have been proposed so far to prevent side-channel attack have problems in that they require a large amount of computation and thus cause performance degradation and they are methods for protecting against only some side-channel attacks. A method secure against all of the side-channel attacks has not been proposed yet. In addition, there has been proposed no method secure against collision attacks.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide an apparatus and method for preventing exposure of important information by a side-channel attack.

In one general aspect, there is provided an apparatus for performing an operation, including a first outputter configured to output a first output value corresponding to a seed value using a first parameter candidate value set, a second outputter configured to output a second output value using a second parameter candidate value set wherein the second output value corresponds to the seed value and is capable of being generated using the first output value, a third outputter configured to output a third output value using the seed value and the first output value, and a fourth outputter configured to output a fourth output value using the second output value and the third output value, wherein the fourth output value is capable of being generated using the seed value.

The second output value may have a value equal to a value obtained through an operation using the first output value as an exponent or a multiplier.

The second parameter candidate value set may include a plurality of second parameter candidate values equal to values obtained through an operation using each of the first parameter candidate values included in the first parameter candidate value set as an exponent or a multiplier.

The first outputter may extract one or more first parameter candidate values corresponding to the seed value from the first parameter candidate value set and generate the first output value using the extracted first parameter candidate values and the second outputter may extract one or more second parameter candidate values corresponding to the seed value from the second parameter candidate value set and generate the second output value using the extracted second parameter candidate values.

The extracted second parameter candidate values may have values equal to values generated through an operation using each of the extracted first parameter candidate values as an exponent or a multiplier.

The apparatus may further include a divider configured to divide the seed value into a plurality of blocks, wherein the first outputter extracts a plurality of first parameter candidate values corresponding to the plurality of blocks from the first parameter candidate value set and the second outputter extracts a plurality of second parameter candidate values corresponding to the plurality of blocks from the second parameter candidate value set.

The fourth output value may be equal to a value generated through an operation using the seed value as an exponent or a multiplier.

The apparatus may further include an encryptor configured to perform at least one of digital signature generation, encryption, and encryption key generation using the seed value and the fourth output value.

In another general aspect, there is provided a method of performing an operation, including outputting a first output value corresponding to a seed value using a first parameter candidate value set, outputting a second output value using a second parameter candidate value set wherein the second output value corresponds to the seed value and is capable of being generated using the first output value, outputting a third output value using the seed value and the first output value, and outputting a fourth output value using the second output value and the third output value, wherein the fourth output value is capable of being generated using the seed value.

The second output value may have a value equal to a value obtained through an operation using the first output value as an exponent or a multiplier.

The second parameter candidate value set may include a plurality of second parameter candidate values equal to values obtained through an operation using each of the first parameter candidate values included in the first parameter candidate value set as an exponent or a multiplier.

The outputting of the first output value may include extracting one or more first parameter candidate values corresponding to the seed value from the first parameter candidate value set and generating the first output value using the extracted first parameter candidate values and the outputting of the second output value may include extracting one or more second parameter candidate values corresponding to the seed value from the second parameter candidate value set and generating the second output value using the extracted second parameter candidate values.

The extracted second parameter candidate values may have values equal to values generated through an operation using each of the extracted first parameter candidate values as an exponent or a multiplier.

The method may further include dividing the seed value into a plurality of blocks, wherein the extracting of the first parameter candidate values comprises extracting a plurality of first parameter candidate values corresponding to the plurality of blocks from the first parameter candidate value set and the extracting of the second parameter candidate values comprises extracting a plurality of second parameter candidate values corresponding to the plurality of blocks from the second parameter candidate value set.

The fourth output value may be equal to a value generated through an operation using the seed value as an exponent or a multiplier.

The method may further include performing at least one of digital signature generation, encryption, and encryption key generation using the seed value and the fourth output value.

Other features and aspects will be apparent from the following detailed description, the drawings, and the claims.

BRIEF DESCRIPTION OF THE DRAWINGS

FIGS. 10 and 11 are diagrams for describing an example of an extraction of a first parameter candidate value and a second parameter candidate value according to a fourth embodiment of the present disclosure.

Figure 1:
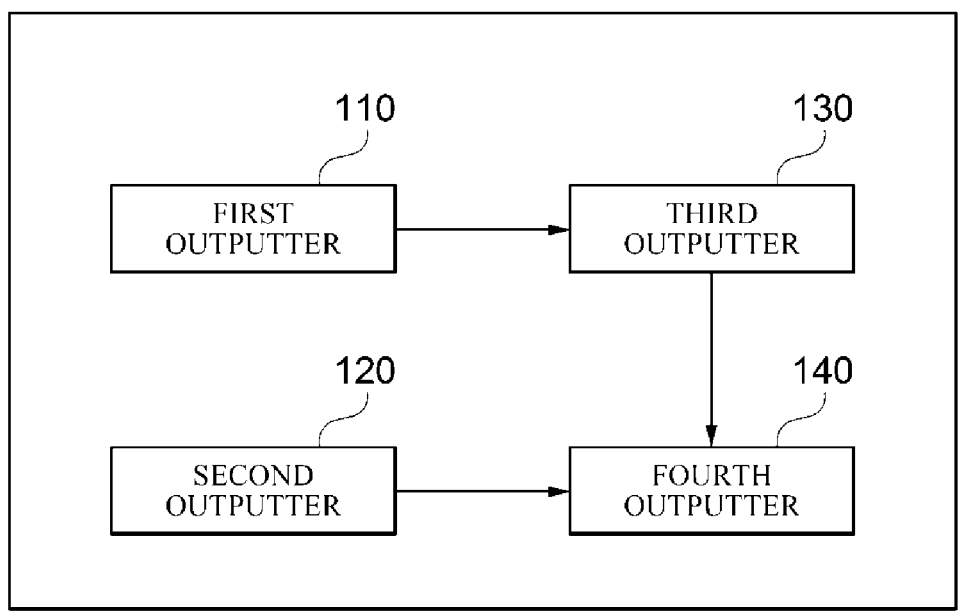
FIG. 1 is a configuration diagram illustrating an apparatus for performing an operation according to one embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a configuration diagram illustrating an apparatus for performing an operation according to one embodiment of the present disclosure.

Referring to FIG. 1, the apparatus 100 for performing an operation according to one embodiment of the present disclosure includes a first outputter 110, a second outputter 120, a third outputter 130, and a fourth outputter 140.

The first outputter 110 outputs a first output value corresponding to a seed value using a set of first parameter candidate values (hereinafter referred to as a first parameter candidate value set).

In this case, the seed value may be an arbitrary value represented by a bit string of a predetermined length. For example, the seed value may be an arbitrary value generated within a predetermined range. In another example, the seed value may be a value obtained by converting a user's ID or an arbitrarily generated value into a bit string of a predetermined length using, for example, a hash function.

In the embodiment of the present disclosure, the seed value may be a value generated using various methods in addition to the above example, and need not be necessarily generated using a particular method.

The first parameter candidate value set may include a plurality of first parameter candidate values. In this case, each of the first parameter candidate values may be a pre-generated arbitrary value or a value selected from a predetermined range.

The second outputter 120 outputs a second output value using a set of second parameter candidate values (hereinafter referred to as a second parameter candidate value set) wherein the second output value corresponds to the seed value and is capable of being generated using the first output value.

Specifically, the second parameter candidate value set may include a plurality of second parameter candidate values. Each of the second parameter candidate values may have the same value as a value obtained through an operation using each of the first parameter candidate values included in the first parameter candidate value set as an exponent or a multiplier.

For example, each of the second parameter candidate values may have the same value obtained through an exponentiation operation using the first parameter candidate values as an exponent as shown in Equation 1 below.

$$r=g^k \qquad \text{[Equation 1]}$$

Here, k denotes a first parameter candidate value, r denotes a second parameter candidate value, g denotes a generator of a multiplicative group having p as an order, and p denotes an arbitrary prime number. Hereinafter, k, r, g, and p represent the same as defined above.

In another example, each of the second parameter candidate values may have the same value as a value obtained through a scalar multiplication operation using the first parameter candidate values as a multiplier as shown in Equation 2 below.

$$r=k \cdot P \qquad \text{[Equation 2]}$$

Here, P represents a generator of an additive group having p as an order, such as an elliptic curve group, and hereinafter will represent the same as defined above.

Meanwhile, according to one embodiment of the present disclosure, the first outputter 110 may extract one first parameter candidate value corresponding to the seed value from the first parameter candidate value set.

In addition, the second outputter 120 may extract one second parameter candidate value from the second parameter candidate value set wherein the one second parameter candidate value corresponds to the seed value and is capable of being generated from, for example, the extracted first parameter candidate value. In this case, the first outputter 110 may output the extracted first parameter candidate value as the first output value and the second outputter 120 may output the extracted second parameter candidate value as the second output value.

For example, the first output value output by the first outputter 110 may be as shown in Equation 3.

$$a=k_e \qquad \text{[Equation 3]}$$

Here, a represents a first output value and $k_e$ represents an extracted first parameter candidate value. Hereinafter, a and $k_e$ represent the same as defined above.

In addition, the second output value output by the second outputter 120 may be as shown in Equation 4 or 5.

$$b=r_e=g^{k_e}=g^a \qquad \text{[Equation 4]}$$

$$b=r_e=(k_e \cdot P)=(a \cdot P) \qquad \text{[Equation 5]}$$

Here, b represents a second output value and $r_e$ represents an extracted second parameter value. Hereinafter, b and $r_e$ represent the same as defined above.

Referring to Equations 4 and 5, it can be seen that the second output value output by the second outputter 120 is equal to a value obtained through an operation using the first output value as an exponent or a multiplier.

Meanwhile, according to another embodiment of the present disclosure, the first outputter 110 may extract one or more first parameter candidate values corresponding to the seed value from the first parameter candidate value set. In addition, the second outputter 120 may extract one or more second parameter candidate values from the second parameter candidate value set, wherein the one or more second parameter candidate values correspond to the seed value and are capable of being generated from each of the extracted first parameter candidate values.

In this case, the first outputter 110 may generate a first output value using the one or more extracted first parameter candidate values and the second outputter 120 may generate a second output value using the one or more extracted second parameter candidate values.

For example, when n (where n is an integer greater than 1) first parameter candidate values and n second parameter candidate values are extracted, the first outputter 110 may generate a first output value by adding the n extracted first parameter candidate values to each other as shown in Equation 6 below.

$$a=k_{e1}+k_{e2}+ \ldots +k_{en} \qquad \text{[Equation 6]}$$

In addition, the second outputter 120 may generate the second output value by adding or multiplying the n extracted second parameter candidate values with each other.

For example, when the second parameter candidate value set includes the second parameter candidate values that can be generated through an operation using each of the first parameter candidate values included in the first parameter candidate value set as an exponent, the second outputter 120 may generate the second output value by multiplying the n extracted second parameter candidate values as shown in Equation 7 below.

$$b=r_{e1} \times r_{e2} \times \ldots \times r_{en} \qquad \text{[Equation 7]}$$

In this case, Equation 7 can be expressed as Equation 8 below.

$$b=g^{(k_{e1}+k_{e2}+ \ldots +k_{en})}=g^a \qquad \text{[Equation 8]}$$

That is, referring to Equation 8, it can be seen that the second output value output by the second outputter 120 is equal to a value obtained through an operation using the first output value as an exponent.

Meanwhile, when the second parameter candidate value set includes second parameter candidate values that can be generated through an operation using each of the first parameter candidate values included in the first parameter candidate value set as a multiplier, the second outputter 120 may generate the second output value by adding the n extracted second parameter candidate values to each other as shown in Equation 9 below.

$$b=r_{e1}+r_{e2}+ \ldots +r_{en} \qquad \text{[Equation 9]}$$

In this case, Equation 9 can be expressed as Equation 10 below.

$$b=(k_{e1}+k_{e2}+\ldots+k_{en})\cdot P=a\cdot P \quad \text{[Equation 10]}$$

That is, referring to Equation 10, it can be seen that the second output value output by the second outputter 120 is equal to a value obtained through an operation using the first output value as a multiplier.

The third outputter 130 outputs a third output value using the seed value and the first output value.

For example, the third outputter 130 may generate a third output value using Equation 11 or 12 below.

$$c=s+a \quad \text{[Equation 11]}$$

$$c=s-a \quad \text{[Equation 12]}$$

Here, s represents a seed value and c represents a third output value. Hereinafter, s and c represent the same as defined above.

Meanwhile, the third outputter 130 may generate the third output value using a one-way function in various forms, which makes it difficult to obtain the seed value and the first output value from the third output value, in addition to Equations 11 and 12.

The fourth outputter 140 generates a fourth output value using the second output value and the third output value, wherein the fourth output value is capable of being generated using the seed value.

Specifically, the fourth outputter 140 may generate a fourth output value using the second output value and the third output value, wherein the fourth output value has a value equal to a value obtained through an operation using the seed value as an exponent or a multiplier.

For example, when the second output value is equal to a value obtained through an operation using the first output value as an exponent, as shown in the foregoing Equation 4 or 8, and the third output value is generated using Equation 11, the fourth outputter 140 may generate a fourth output value using Equation 13 below.

$$d = \frac{g^c}{b} \quad \text{[Equation 13]}$$

Here, d represents a fourth output value and hereinafter represents the same.

Meanwhile, Equation 13 can be expressed as Equation 14 below.

$$d = \frac{g^{(s+a)}}{g^a} = g^s \quad \text{[Equation 14]}$$

In another example, when the second output value is equal to a value obtained through an operation using the first output value as an exponent, as shown in the foregoing Equation 4 or 8, and the third output value is generated using Equation 12, the fourth outputter 140 may generate a fourth output value using Equation 15 below.

$$d=g^c\cdot b \quad \text{[Equation 15]}$$

Meanwhile, Equation 15 can be expressed as Equation 16 below.

$$d=g^{(s-a)}\cdot g^a=g^s \quad \text{[Equation 16]}$$

In another example, when the second output value is equal to a value obtained through an operation using the first output value as a multiplier, as shown in Equation 5 or 10, and the third output value is generated using Equation 11, the fourth outputter 140 may generate a fourth output value using Equation 17 below.

$$d=c\cdot P-b \quad \text{[Equation 17]}$$

Meanwhile, Equation 17 can be expressed as Equation 18 below.

$$d=(s+a)\cdot P-a\cdot P=s\cdot P \quad \text{[Equation 18]}$$

In another example, when the second output value is equal to a value obtained through an operation using the first output value as a multiplier, as shown in Equation 5 or 10, and the third output value is generated using Equation 12, the fourth outputter 140 may generate a fourth output value using Equation 19 below.

$$d=c\cdot P+b \quad \text{[Equation 19]}$$

Meanwhile, Equation 19 can be expressed as Equation 20 below.

$$d=(s-a)\cdot P+a\cdot P=s\cdot P \quad \text{[Equation 20]}$$

In addition to the above examples, the fourth outputter 140 may use a one-way function in various forms which can generate a fourth output value equal to a value capable of being generated through an operation using the seed value as an exponent or a multiplier by using the second output value and the third output value.

Although the fourth output value is equal to a value obtained through an operation using the seed value as an exponent or a multiplier as described above, the fourth outputter 140 does not use the seed value but uses the second output value and the third output value to generate the fourth output value. In addition, in the entire procedure of the apparatus 100 to generate the fourth output value from the seed value, an operation using the seed value as an exponent or a multiplier is not performed, and hence it is not possible to obtain the seed value through side-channel attack.

Figure 2:
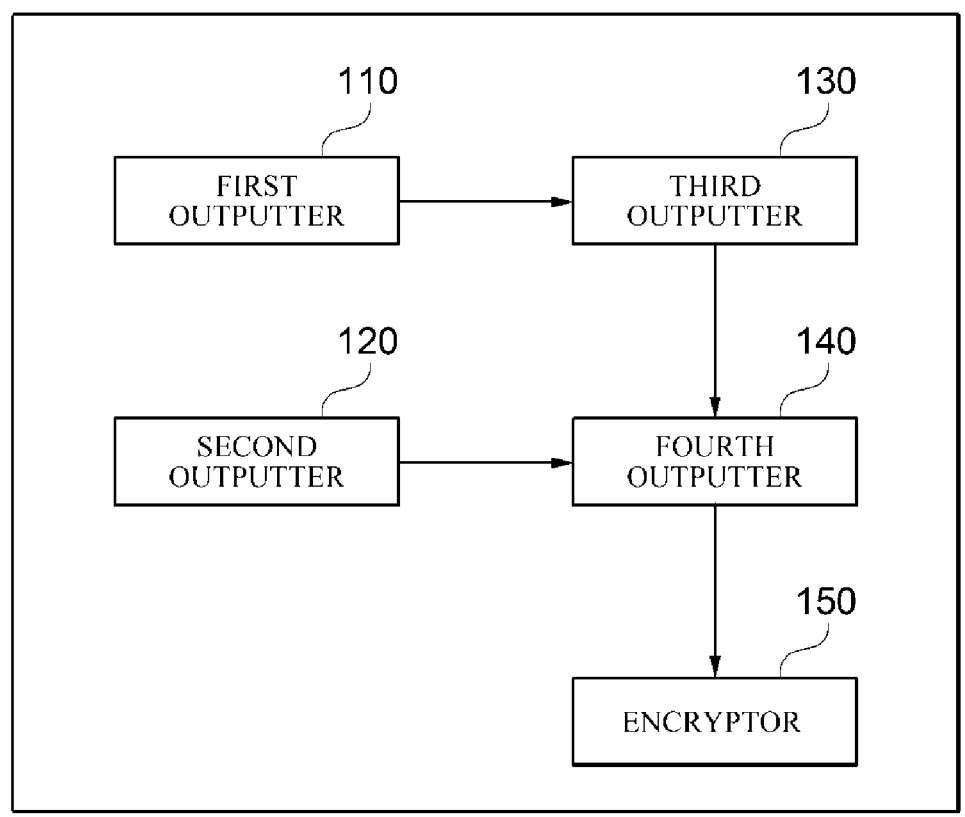
FIG. 2 is a configuration diagram illustrating an operation for performing an operation according to an additional embodiment of the present disclosure.

FIG. 2 is a configuration diagram illustrating an operation for performing an operation according to an additional embodiment of the present disclosure.

Referring to FIG. 2, the apparatus 100 for performing an operation may further include an encryptor 150.

The encryptor 150 performs at least one of encryption key generation, digital signature generation, and encryption using a seed value and a fourth output value.

For example, the encryptor 150 may generate an encryption key using a key exchange algorithm, such as a Diffie-Hellman key exchange algorithm, which requires an exponentiation operation.

Specifically, an illustrative encryption key generation procedure in accordance with a Diffie-Hellman key exchange algorithm is as follows:

1) A chooses a random integer $X_1$, where $X_1 \in [1,p-1]$, and then generates $Y_1 = g^{x_1} \bmod p$ 2) B chooses a random integer X2, where $X_2 \in [1,p-1]$, and then generates $Y_2 = g^{x_2} \bmod p$ 3) A and B exchange $Y_1$ and $Y_2$ 4) A computes $S_k = Y_2^{x_1} \bmod p = g^{x_1 x_2} \bmod p$ to generate an encryption key $S_k$ 5) B computes $S_k = Y_1^{x_2} \bmod p = g^{x_1 x_2} \bmod p$ to generate an encryption key $S_k$ In this case, the encryptor 150 may use the seed value as $X_1$ or $X_2$ and use the fourth output value as $g^{x_1}$ or $g^{x_2}$. That is, the encryptor 150 may generate $Y_1$ or $Y_2$ without a direct operation for $g^{x_1}$ or $g^{x_2}$.

In another example, the encryptor 150 may generate an encryption key according to a key exchange algorithm, such as an elliptic curve Diffie-Hellman (ECDH) key exchange algorithm, which requires a scalar multiplication operation.

Specifically, an illustrative encryption key generation procedure in accordance with an ECDH key exchange algorithm is as follows:

1) A chooses a random integer $X_a$, where $X_a \in [1,n-1]$, and then generates $Y_a = X_a \cdot P$
2) B chooses a random integer $X_b$, where $X_b \in [1,n-1]$, and then generates $Y_b = X_b \cdot P$
3) A and B exchange $Y_a$ and $Y_b$
4) A computes $S_k = X_a \cdot Y_b = X_a \cdot (X_b \cdot P)$ to generate an encryption key $S_k$
5) B computes $S_k = X_b \cdot Y_a = X_b \cdot (X_a \cdot P)$ to generate an encryption key $S_k$ In this case, the encryptor 150 may use the seed value as $X_a$ or $X_b$ and use the fourth output value as $Y_a$ or $Y_b$. That is, the encryptor 150 may generate $Y_a$ or $Y_b$ without a direct operation for $X_a \cdot P$ or $X_b \cdot P$.

In another example, the encryptor 150 may perform encryption using an encryption algorithm, such as an ElGamal encryption algorithm, which requires an exponentiation operation.

Specifically, an illustrative encryption procedure in accordance with the ElGamal encryption algorithm is as follows:

1) A random integer t is chosen, where $t \in [1,p-1]$
2) $C_1 = g^t \bmod p$ is computed
3) $C_2 = (pk^t \bmod p) \cdot M$ is computed (where pk is a public key and M is a message to be encrypted)
4) Ciphertext $(C_1, C_2)$ is output In this case, the encryptor 150 may use the seed value as t and use the fourth output value as $g^t$. That is, the encryptor 150 may generate the ciphertext $C_1$ without a direct operation for $g^t$.

In another example, the encryptor 150 may perform encryption using an encryption algorithm, such as an elliptic curve cryptography (ECC) algorithm, which requires a scalar multiplication operation.

Specifically, an illustrative encryption procedure in accordance with the ECC algorithm is as follows:

1) A random integer t is chosen, where $t \in [1,n-1]$
2) $C_1 = t \cdot P$ is computed
3) $C_2 = t \cdot Q + M$ is computed (where Q is a public key and M is a message to be encrypted)
4) Ciphertext $(C_1, C_2)$ is output In this case, the encryptor 150 may use the seed value as t and use the fourth output value as $C_1$. That is, the encryptor 150 may generate ciphertext $C_1$ without a direct operation for $t \cdot P$.

In another example, the encryptor 150 may generate a digital signature using a digital signature algorithm (DSA) which requires an exponentiation operation.

Specifically, an illustrative digital signature generation procedure in accordance with DSA is as follows:

1) A random integer t is chosen, where $t \in [1,q-1]$ (where, q is a prime divisor of p-1)
2) $R = (g^t \bmod p) \bmod q$ is computed
3) $S = t^{-1}(H(m) + CR) \bmod q$ is computed (where C is a secret key, m is a message, and HO is a hash function)
4) Signature values (R, S) for a message are output In this case, the encryptor 150 may use the seed value as t and use the fourth output value as $g^t$. That is, the encryptor 150 may generate a signature value R without a direct operation for $g^t$.

In another example, the encryptor 150 may generate a digital signature using a digital signature algorithm, such as an elliptic curve digital signature algorithm (ECDSA), which requires a scalar multiplication operation.

Specifically, a digital signature generation procedure in accordance with the ECDSA is as follows:

1) A random integer t is selected, where $t \in [1,n-1]$
2) $t \cdot P = (x_1, y_1)$ is computed
3) $R = x_1 \bmod n$ is computed
4) $S = t^{-1}(H(m) + CR) \bmod n$ is computed (where C is a secret key, m is a message, and HO is a hash function)
5) Signature values (R, S) for a message are output In this case, the encryptor 150 may use the seed value as t and use the fourth output value as $t \cdot P$. That is, the encryptor 150 may generate a digital value R without a direct operation for $t \cdot P$.

Figure 3:
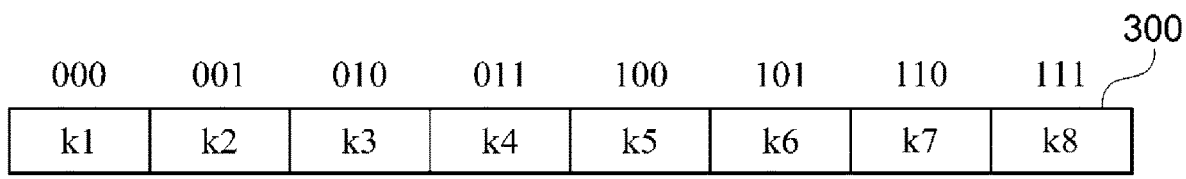
FIGS. 3 and 4 are diagrams for describing an example of an extraction of a first parameter candidate value and a second parameter candidate value according to a first embodiment of the present disclosure.
Figure 4:
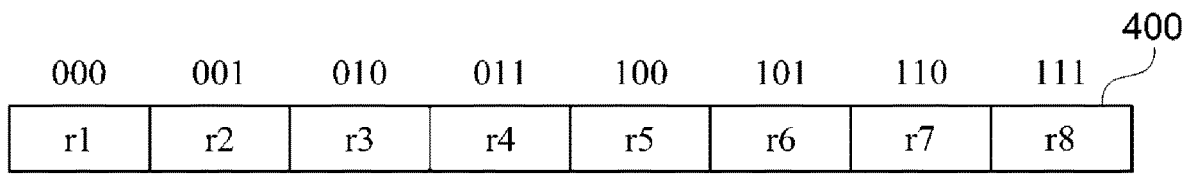

FIGS. 3 and 4 are diagrams for describing an example of an extraction of a first parameter candidate value and a second parameter candidate value according to a first embodiment of the present disclosure.

Meanwhile, in the example shown in FIGS. 3 and 4, it is assumed for convenience of description that a seed value has a length of 3 bits.

Referring to FIGS. 3 and 4, bit strings, which each have a length of 3 bits, stated above a first parameter candidate value set 300 and a second parameter candidate value set 400 represent index values that are assigned, respectively, to first parameter candidate values and second parameter candidate values. In this case, the index value may be represented by a bit string with the same length as the seed value. That is, in the example shown in FIGS. 3 and 4, as the length of the seed value is assumed to be 3 bits, the index value is represented as a bit string with a length of 3 bits. However, the length of the index value may vary according to the length of the seed value.

Meanwhile, the first parameter candidate value set 300 may include $2^n$ (where n is a length of a seed value) first parameter candidate values and the second parameter candidate value set 400 may include the same number of second parameter candidate values as the number of the first parameter candidate values included in the first parameter candidate value set 300. In the example shown in FIGS. 3 and 4, as the length of the seed value is assumed to be 3 bits, the first parameter candidate value set 300 includes 8 first parameter candidate values and the second parameter candidate value set 400 includes 8 second parameter candidate values.

Meanwhile, each of the second parameter candidate values included in the second parameter candidate value set 400 may be the same as a value generated through an operation using the first parameter candidate value having the same index value as the second parameter candidate value as an exponent or a multiplier.

Specifically, second parameter candidate value $r_1$ having an index value '000' may be the same as a value generated through an exponentiation operation that uses first parameter candidate value $k_1$ having an index value '000' as an exponent, as shown in Equation 21 below.

$$r_1 = g^{k_1} \qquad \text{[Equation 21]}$$

In another example, second parameter candidate value $r_1$ having an index value '000' may be the same as a value generated through a scalar multiplication operation which uses first parameter candidate value $k_1$ having an index value '000' as a multiplier, as shown in Equation 22 below.

$$r_1 = k_1 \cdot P \qquad \text{[Equation 22]}$$

Meanwhile, the first outputter 110 may compare an index value of each of the first parameter candidate values included in the first parameter candidate value set 300 to the seed value to extract a first parameter candidate value having an index value identical to the seed value. In this case, the first outputter 110 may output the extracted first parameter candidate value as a first output value.

In addition, the second outputter 120 may compare an index value of each of the second parameter candidate values included in the second parameter candidate value set 400 to the seed value to extract a second parameter candidate value having an index value identical to the seed value. In this case, the second outputter 120 may output the extracted second parameter candidate value as a second output value.

For example, when the seed value is '010,' the first outputter 110 may extract a first parameter candidate value $k_3$ that has an index value '010' from the first parameter candidate value set 300 and the second outputter 120 may extract a second parameter candidate value $r_3$ that has an index value '010' from the second parameter candidate value set 400.

In this case, the first outputter 110 may output the extracted $k_3$ as the first output value and the second outputter 120 may output the extracted $r_3$ as the second output value.

That is, in the example shown in FIGS. 3 and 4, when the seed value is '010,' the first output value is obtained as Equation 23 and the second output value is obtained as Equation 24 or 25.

$$a=k_3 \qquad \text{[Equation 23]}$$

$$b=r_3=g^{k_3}=g^a \qquad \text{[Equation 24]}$$

$$b=r_3=k_3 \cdot P=a \cdot P \qquad \text{[Equation 25]}$$

That is, referring to Equations 24 and 25, it can be seen in the example shown in FIGS. 3 and 4 that the second output value output by the second outputter 120 is the same as a value generated through an operation using the first output value as an exponent or a multiplier.

Figure 5:
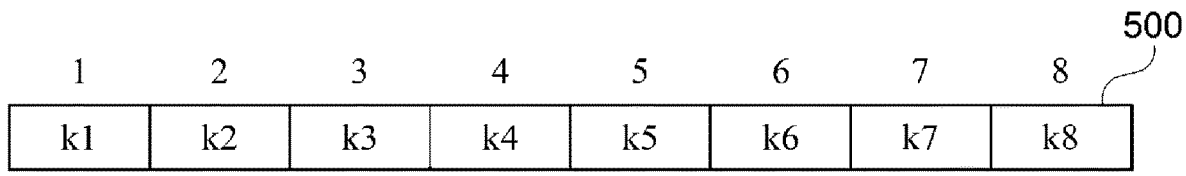
FIGS. 5 and 6 are diagrams for describing an example of an extraction of a first parameter candidate value and a second parameter candidate value according to a second embodiment of the present disclosure.
Figure 6:
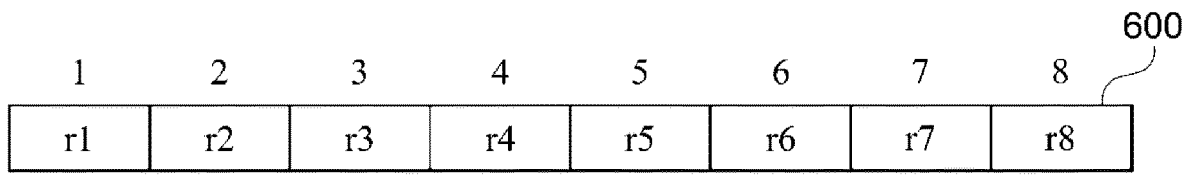

FIGS. 5 and 6 are diagrams for describing an example of an extraction of a first parameter candidate value and a second parameter candidate value according to a second embodiment of the present disclosure.

In the example shown in FIGS. 5 and 6, it is assumed for convenience of description that a seed value has a length of 8 bits.

Referring to FIGS. 5 and 6, numbers stated above a first parameter candidate value set 500 and a second parameter candidate value set 600 represent index values assigned to the first parameter candidate values and the second parameter candidate values, respectively.

The first parameter candidate value set 500 may include n (where n is a length of the seed value) first parameter candidate values and the second parameter candidate value set 600 may include the same number of second parameter candidate values as the number of the first parameter candidate values included in the first parameter candidate value set 500. In the example shown in FIGS. 5 and 6, it is assumed that the length of the seed value is 8 bits, and hence the first parameter candidate value set 500 includes 8 first parameter candidate values and the second parameter candidate value set 600 also includes 8 second parameter candidate values.

Meanwhile, each of the second parameter candidate values included in the second parameter candidate value set 600 may be the same as a value generated through an operation using the first parameter candidate value having the same index value as the second parameter candidate value as an exponent or a multiplier.

Specifically, a second parameter candidate value $r_2$ having an index value of '2' may be the same as a value obtained through an exponentiation operation using a first parameter candidate value $k_2$ having an index value of '2' as an exponent, as shown in Equation 26 below.

$$r_2=g^{k_2} \qquad \text{[Equation 26]}$$

In another example, a second parameter candidate value $r_2$ having an index value of '2' may be the same as a value obtained through a scalar multiplication operation using a first parameter candidate value $k_2$ having an index value of '2' as a multiplier, as shown in Equation 27.

$$r_2=k_2 \cdot P \qquad \text{[Equation 27]}$$

The first outputter 110 may extract one or more first parameter candidate values having an index value corresponding to a position of a specific bit value in a bit string of the seed value from the first parameter candidate value set 500. In addition, the second outputter 120 may extract one or more second parameter candidate values corresponding to a position of a specific bit value in a bit string of the seed value.

For example, assuming that the seed value is '01100010,' a bit value of '1' is placed at the second, third and seventh positions in the seed value and a bit value of '0' is placed at the first, fourth, fifth, sixth, and eighth positions.

In this case, the first outputter 110 and the second outputter 120 may respectively extract the first parameter candidate values $\{k_2, k_3, k_7\}$ and the second parameter candidate values $\{r_2, r_3, r_7\}$ that have index values 2, 3, and 7, respectively, corresponding to the positions of the bit value of '1' in the seed value. In another example, the first outputter 110 and the second outputter 120 may respectively extract the first parameter candidate values $\{k_1, k_4, k_5, k_6, k_8\}$ and the second candidate values $\{r_1, r_4, r_5, r_6, r_8\}$ that have index values 1, 4, 5, 6, 8, respectively, corresponding to the positions of a bit value of '0' in the seed value.

In the above-described example, when the first parameter candidate values $\{k_2, k_3, k_7\}$ and the second parameter candidate values $\{r_2, r_3, r_7\}$ are extracted, the first outputter 110 may generate a first output value using, for example, Equation 28 below.

$$a=k_2+k_3+k_7 \qquad \text{[Equation 28]}$$

In addition, when the second parameter candidate values $\{r_2, r_3, r_7\}$ are equal to values obtained through an operation using each of the first parameter candidate values $\{k_2, k_3, k_7\}$ as an exponent, the second outputter 120 may generate a second output value using, for example, Equation 29 below.

$$b=r_2 \times r_3 \times r_7 \qquad \text{[Equation 29]}$$

In this case, Equation 29 can be expressed as Equation 30 below.

$$b=g^{(k_2+k_3+k_7)}=g^a \qquad \text{[Equation 30]}$$

On the other hand, when the extracted second parameter candidate values $\{r_2, r_3, r_7\}$ are equal to values obtained through an operation using each of the first parameter candidate values $\{k_2, k_3, k_7\}$ as a multiplier, the second outputter 120 may generate a second output value using, for example, Equation 31 below.

$$b=r_2+r_3+r_7 \qquad \text{[Equation 31]}$$

In this case, Equation 31 can be expressed as Equation 32 below.

$$b=(k_2+k_3+k_7) \cdot P=a \cdot P \qquad \text{[Equation 32]}$$

That is, referring to Equations 29 to 32, it can be seen in the example shown in FIGS. 5 and 6 that the second output value output by the second outputter 120 is equal to a value derived through an operation using the first output value as an exponent or a multiplier.

Figure 7:
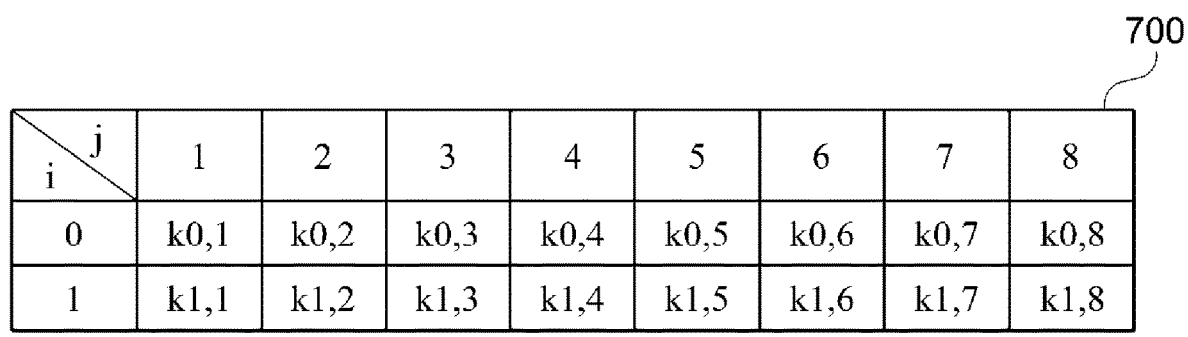
FIGS. 7 and 8 are diagrams for describing an example of an extraction of a first parameter candidate value and a second parameter candidate value according to a third embodiment of the present disclosure.
Figure 8:
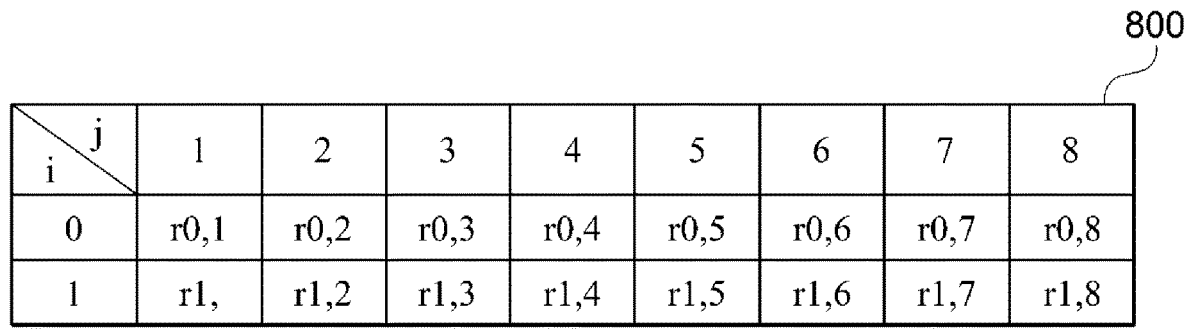

FIGS. 7 and 8 are diagrams for describing an example of an extraction of a first parameter candidate value and a second parameter candidate value according to a third embodiment of the present disclosure.

In the example shown in FIGS. 7 and 8, it is assumed for convenience of description that a seed value has a length of 8 bits.

Referring to FIGS. 7 and 8, numbers stated above and on the left of a first parameter candidate value set 700 and a second parameter candidate value set 800 represent index values assigned to each of first parameter candidate values and second parameter candidate values. That is, each of the first parameter candidate values and the second parameter candidate values has index values (i, j) in the example shown in FIGS. 7 and 8. Here, an index value i corresponds to a bit value of each bit constituting a bit string of the seed value and an index value j corresponds to a position of each bit in the bit string of the seed value.

The first parameter candidate value set 700 may include 2×n (where n is a length of the seed value) first parameter candidate values and the second parameter candidate value set 800 may include the same number of second parameter candidate values as the number of the first parameter candidate values included in the first parameter candidate value set 700. In the shown example, as the length of the seed value is assumed to be 8 bits, the first parameter candidate value set 700 includes 2×8 first parameter candidate values and the second parameter candidate value set 800 also includes 2×8 second parameter candidate values.

Meanwhile, each of the second parameter candidate values included in the second parameter candidate value set 800 may be equal to a value generated through an operation using the first parameter candidate value having the same index value as the second parameter candidate value as an exponent or a multiplier.

Specifically, a second parameter candidate value $r_{i,j}$ may be the same as a value obtained through an exponentiation operation using, for example, a first parameter candidate value $k_{i,j}$ as an exponent, as shown in Equation 33 below.

$$r_{i,j}=g^{k_{i,j}} \quad \text{[Equation 33]}$$

In another example, the second parameter candidate value may have a value equal to a value obtained through a scalar multiplication operation using a first parameter candidate value $k_{i,j}$ as a multiplier, as shown in Equation 34 below.

$$r_{i,j}=k_{i,j} \cdot P \quad \text{[Equation 34]}$$

Meanwhile, the first outputter 110 may extract a plurality of first parameter candidate values having index values corresponding to a bit value of each bit constituting a bit string of the seed value and a position of the bit in the bit string from the first parameter candidate value set 700. In addition, the second outputter 120 may extract a plurality of second parameter candidate values having index values respectively corresponding to a bit value of each bit constituting a bit string of the seed value and a position of the bit in the bit string from the second parameter candidate value set 800.

Specifically, for example, assuming that the seed value is '01100010,' a bit value of the first bit in the seed value is '0,' and thus the first outputter 110 and the second outputter 120 may respectively extract a first parameter candidate value $k_{0,1}$ and a second parameter candidate value $r_{0,1}$ that have index values of (0,1).

In addition, since a bit value of the second bit in the seed value is '1,' the first outputter 110 and the second outputter 120 may respectively extract a first parameter candidate value $k_{1,2}$ and a second parameter candidate value $r_{1,2}$ that have index values of (1,2).

In the same way, the first outputter 110 may extract first parameter candidate values $\{k_{0,1}, k_{1,2}, k_{1,3}, k_{0,4}, k_{0,5}, k_{0,6}, k_{1,7}, k_{0,8}\}$ and the second outputter 120 may extract second parameter candidate values $\{r_{0,1}, r_{1,2}, r_{1,3}, r_{0,4}, r_{0,5}, r_{0,6}, r_{1,7}, r_{0,8}\}$.

In this case, the first outputter 110 may generate a first output value using, for example, Equation 35 below.

$$a=k_{0,1}+k_{1,2}+k_{1,3}+k_{0,4}+k_{0,5}+k_{0,6}+k_{1,7}+k_{0,8} \quad \text{[Equation 35]}$$

When the second parameter candidate value included in the second parameter candidate value set 800 is the same as a value obtained through, for example, an exponentiation operation shown in Equation 33, the second outputter 120 may output a second output value using, for example, Equation 36 below.

$$b=r_{0,1} \times r_{1,2} \times r_{1,3} \times r_{0,4} \times r_{0,5} \times r_{0,6} \times r_{1,7} \times r_{0,8} \quad \text{[Equation 36]}$$

In this case, Equation 36 can be expressed as Equation 37.

$$b=g^{(k_{0,1}+k_{1,2}+k_{1,3}+k_{0,4}+k_{0,5}+k_{0,6}+k_{1,7}+k_{0,8})}=g^a \quad \text{[Equation 37]}$$

On the other hand, when the second parameter candidate value included in the second parameter candidate value set 800 is the same as a value obtained through, for example, a multiplication operation shown in Equation 34, the second outputter 120 may output a second output value using, for example, Equation 38 below.

$$b=r_{0,1}+r_{1,2}+r_{1,3}+r_{0,4}+r_{0,5}+r_{0,6}+r_{1,7}+r_{0,8} \quad \text{[Equation 38]}$$

In this case, Equation 38 can be expressed as Equation 39 below.

$$b=(k_{0,1}+k_{1,2}+k_{1,3}+k_{0,4}+k_{0,5}+k_{0,6}+k_{1,7}+k_{0,8}) \cdot P=a \cdot P \quad \text{[Equation 39]}$$

That is, referring to Equations 36 to 39, it can be seen in the example shown in FIGS. 7 and 8 that the second output value output by the second outputter 120 has a value equal to the value obtained through an operation using the first output value as an exponent or a multiplier.

Figure 9:
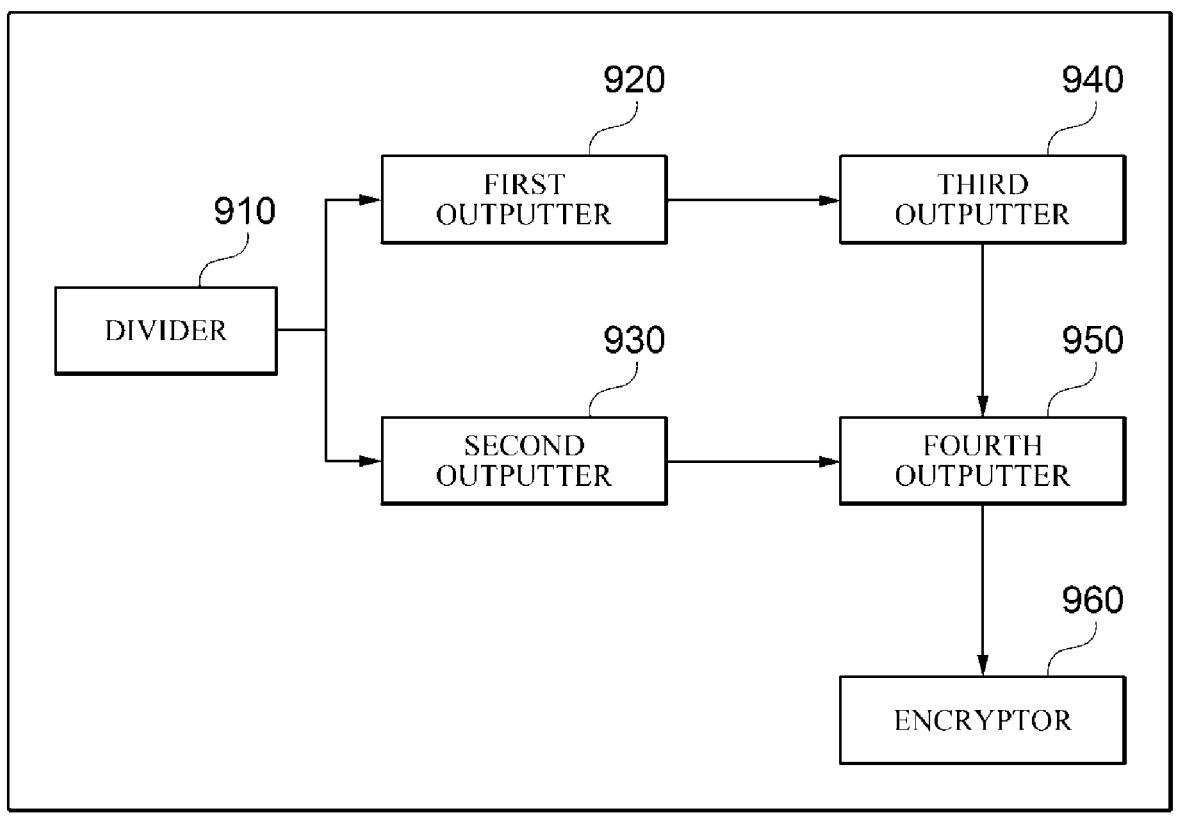
FIG. 9 is a block diagram illustrating an apparatus for performing an operation according to another embodiment of the present disclosure.

FIG. 9 is a block diagram illustrating an apparatus for performing an operation according to another embodiment of the present disclosure.

Referring to FIG. 9, the apparatus 900 for performing an operation according to one embodiment of the present disclosure includes a divider 910, a first outputter 920, a second outputter 930, a third outputter 940, and a fourth outputter 950, and may further include an encryptor 960 according to an embodiment.

In the example shown in FIG. 9, the third outputter 940 and the fourth outputter 950 have the same configurations as the third outputter 130 and the fourth outputter 140 shown in FIG. 1, respectively, and the encryptor 960 has the same configuration as the encryptor 150 shown in FIG. 2, and hence detailed descriptions thereof will not be reiterated.

The divider 910 divides a seed value into a plurality of blocks.

Specifically, according to one embodiment of the present invention, the divider 910 may generate a plurality of blocks by dividing the seed value by a predetermined size. In this case, the number of blocks generated by the divider 910 may be changed according to an embodiment.

For example, when the seed value is a bit string with a length of 256 bits, the divider 910 may divide the seed value into units of 8 bits to generate 32 blocks.

The first outputter 920 may extract a plurality of first parameter candidate values respectively corresponding to the plurality of blocks divided by the divider 910 from a first parameter candidate value set. In addition, the first outputter 920 may generate a first output value using the plurality of extracted first parameter candidate values.

For example, the first outputter 920 may generate a first output value by adding the extracted first parameter candidate values to each other, as shown in the foregoing Equation 6.

The second outputter 930 may extract a plurality of second parameter candidate values respectively corresponding to the plurality of blocks divided by the divider 910 from a second parameter candidate value set. In this case, the extracted second parameter candidate values may be equal to values generated through an operation using each of the first parameter candidate values extracted by the first outputter 920 as an exponent or a multiplier.

Meanwhile, the second outputter 930 may generate a second output value using the plurality of extracted second parameter candidate values.

For example, when the second parameter candidate values set includes second parameter candidate values that have the same values as values obtained through an operation using each of the first parameter candidate values as an exponent, the second outputter 930 may generate a second output value by multiplying the extracted second parameter candidate values with each other, as shown in the foregoing Equation 7.

In another example, when the second parameter candidate values set includes second parameter candidate values that have the same values as values obtained through an operation using each of the first parameter candidate values as a multiplier, the second outputter 930 may generate a second output value by adding the extracted second parameter candidate values to each other, as shown in the foregoing Equation 9.

Figure 11:
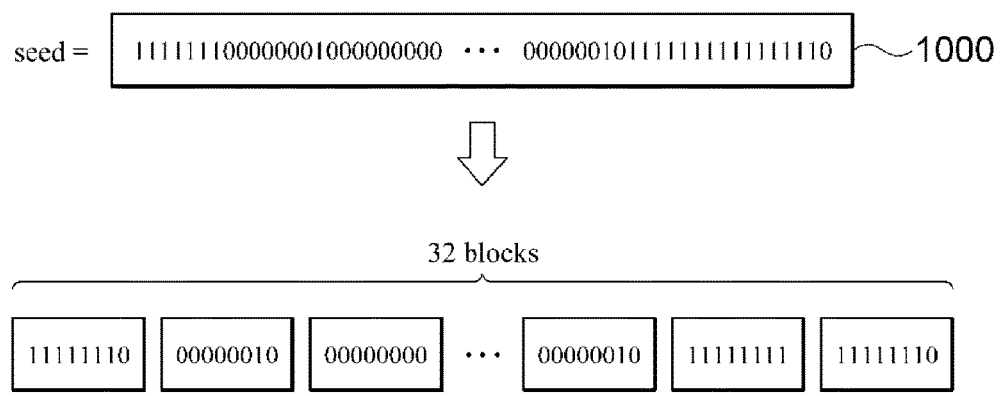

FIGS. 10 and 11 are diagrams for describing an example of an extraction of a first parameter candidate value and a second parameter candidate value according to a fourth embodiment of the present disclosure.

In the example shown in FIGS. 10 and 11, it is assumed that a length of a seed value 1000 is 256 bits and a divider 910 divides the seed value 1000 into 32 blocks which each have a length of 8 bits.

Referring to FIGS. 10 and 11, each first parameter candidate value included in a first parameter candidate value set 1010 and each second parameter candidate value included in a second parameter candidate value set 1020 have index values (i, j). In this case, an index value i represents an index value corresponding to a bit string of each of the divided blocks and an index value j represents an index value corresponding to a position of each of the divided blocks in the seed value.

Meanwhile, the first parameter candidate value set 1010 may include $2^n \times m$ (where n is a length of a bit string of each of the divided blocks and m is the number of divided blocks) first parameter candidate values and the second parameter candidate value set 1020 may include the same number of second parameter candidate values as the number of first parameter candidate values included in the first parameter candidate value set 1010. In the illustrated example, as it is assumed that the seed value 1000 is divided into 32 blocks which each have a length of 8 bits, the first parameter candidate value set 1010 includes $2^8 \times 32$ first parameter candidate values and the second parameter candidate value set 1020 also includes $2^8 \times 32$ second parameter candidate values.

Each of the second parameter candidate values included in the second parameter candidate value set 1020 may have a value equal to a value obtained through an operation using a first parameter candidate value having the same index value as the second parameter candidate value as an exponent. Specifically, the second parameter candidate value $r_{i,j}$ may be the same as a value generated through an operation using, for example, a first parameter candidate value $k_{i,j}$ as an exponent as shown in the foregoing Equation 33.

In another example, each of the second parameter candidate values included in the second parameter candidate value set 1020 may have a value equal to a value obtained through an operation using a first parameter candidate value having the same index value as the second parameter candidate value as a multiplier. Specifically, the second parameter candidate value $r_{i,j}$ may be the same as a value generated through an operation using, for example, a first parameter candidate value $k_{i,j}$ as a multiplier as shown in the foregoing Equation 34.

The first outputter 920 may extract a first parameter candidate value having index values corresponding to a bit string of each block and a position of the block in the seed value from the first parameter candidate value set 1010. In addition, the second outputter 930 may extract a second parameter candidate value having an index value corresponding to a bit string of each block and a position of the block in the seed value from the second parameter candidate value set 1020.

Specifically, in the example shown in FIGS. 10 and 11, a bit string of the first block among the blocks divided from the seed value 1000 is '11111110,' and thus the first outputter 920 and the second outputter 930 may respectively extract a first parameter candidate value $k_{255,1}$ and a second parameter candidate value $r_{255,1}$ which each have index values (255,1).

In addition, a bit string of the second block among the blocks divided from the seed value 1000 is '00000010,' and hence the first outputter 920 and the second outputter 930 may respectively extract a first parameter candidate value $k_{3,2}$ and a second parameter candidate value $r_{3,2}$ which each have index values (3,2)

In the same way, the first outputter 920 may extract first parameter candidate values $\{k_{255,1}, k_{3,2}, k_{1,3}, \ldots, k_{3,30}, k_{256,31}, k_{255,32}\}$ and the second outputter 930 may extract second parameter candidate values $\{r_{255,1}, r_{3,2}, r_{1,3}, \ldots, r_{3,30}, r_{256,31}, r_{255,32}\}$.

In this case, the first outputter 920 may generate a first output value using, for example, Equation 40 below.

$$a = k_{255,1} + k_{3,2} + k_{1,3} + \ldots + k_{3,30} + k_{256,31} + k_{255,32} \qquad \text{[Equation 40]}$$

Meanwhile, when the second parameter candidate value included in the second parameter candidate value set 1020 is the same as a value obtained through, for example, an exponentiation operation shown in Equation 33, the second outputter 930 may generate a second output value using, for example, Equation 41 below.

$$b = r_{255,1} \times r_{3,2} \times r_{1,3} \times \ldots \times r_{3,30} \times r_{256,31} \times r_{255,32} \qquad \text{[Equation 42]}$$

In this case, Equation 41 can be expressed as Equation 42 below.

$$b = g^{(k_{255,1} + k_{3,2} + k_{1,3} + \ldots + k_{3,30} + k_{256,31} + k_{255,32})} = g^a \qquad \text{[Equation 43]}$$

On the other hand, the second parameter candidate value included in the second parameter candidate value set 1020 is the same as a value obtained through a scalar multiplication operation shown in Equation 34, the second outputter 930 may generate a second output value using, for example, Equation 43 below.

$$b = r_{255,1} + r_{3,2} + r_{1,3} + \ldots + r_{3,30} + r_{256,31} + r_{255,32} \quad \text{[Equation 43]}$$

In this case, Equation 43 can be expressed as Equation 44.

$$b = (k_{255,1} + k_{3,2} + k_{1,3} + \ldots + k_{3,30} + k_{256,31} + k_{255,32}) \cdot P = a \cdot P \text{[Equation 44]}$$

That is, referring to Equations 41 to 44, it can be seen that the second output value generated by the second outputter 930 has a value equal to a value derived through an operation using the first output value as a multiplier or an exponent.

Figure 12:
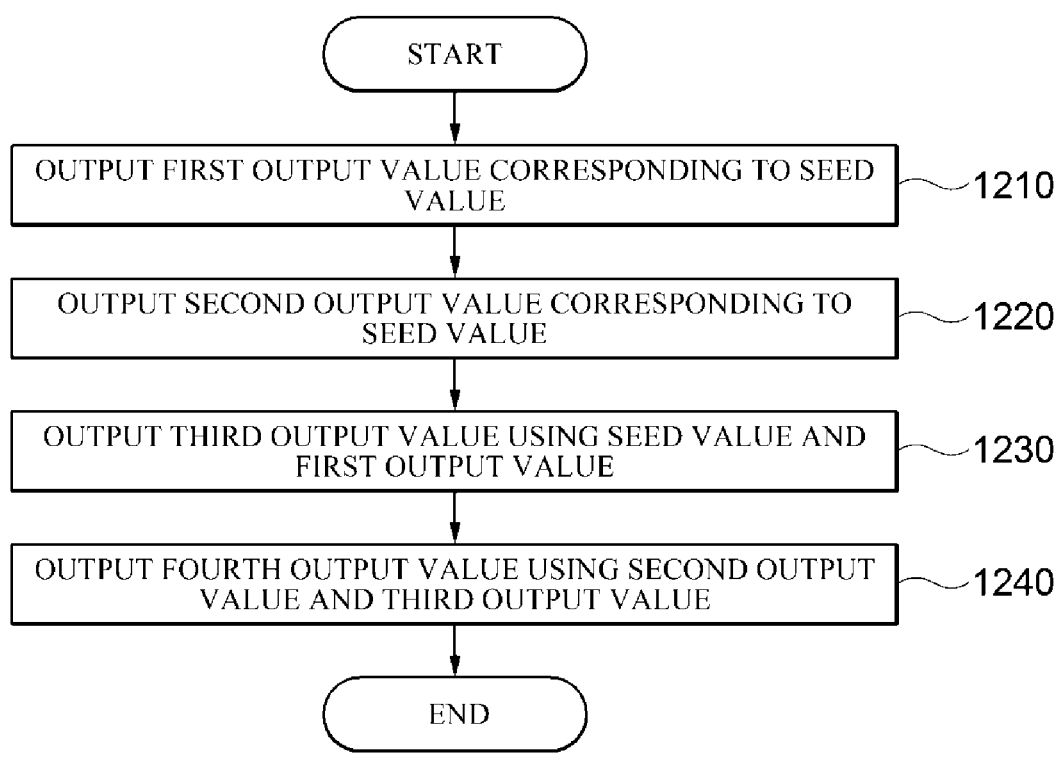
FIG. 12 is a flowchart illustrating a method of performing an operation according to one embodiment of the present disclosure.

FIG. 12 is a flowchart illustrating a method of performing an operation according to one embodiment of the present disclosure.

The method shown in FIG. 12 may be performed by the apparatus 100 illustrated in FIG. 1 or 2.

Referring to FIG. 12, the apparatus 100 extracts a first output value corresponding to a seed value using a first parameter candidate value set (1210).

Specifically, according to one embodiment of the present disclosure, the apparatus 100 may extract one or more first parameter candidate values corresponding to the seed value from the first parameter candidate value set and output the first output value using the one or more extracted first parameter candidate values. In this case, the apparatus 100 may generate the first output value by, for example, adding the one or more extracted first parameter candidate values to each other.

Then, the apparatus 100 outputs a second output value corresponding to the seed value using a second parameter candidate value set (1220).

In this case, according to one embodiment of the present disclosure, second parameter candidate values included in the second parameter candidate value set may have values equal to values obtained through an operation using each of the first parameter candidate values included in the first parameter candidate value set as an exponent or a multiplier.

Meanwhile, according to one embodiment of the present disclosure, the apparatus 100 may extract one or more second parameter candidate values corresponding to the seed value from the second parameter candidate value set and output the second output value using the one or more extracted second parameter candidate values. In this case, the apparatus 100 may generate the second output value by, for example, adding or multiplying the one or more extracted second parameter candidate values with each other and the second output value may be equal to a value obtained through an operation using the first output value as an exponent or a multiplier.

Then, the apparatus 100 outputs a third output value using the seed value and the first output value (1230).

Specifically, the apparatus 100 may generate the third output value through, for example, addition or subtraction using the seed value and the first output value. In this case, the third output value may be generated using a one-way function in various forms, as well as the aforementioned addition or subtraction.

Then, the apparatus 100 outputs a fourth output value using the second output value and the third output value (1240).

In this case, according to one embodiment of the present disclosure, the apparatus 100 may generate the fourth output value using a one-way function in various forms and the fourth output value may be equal to a value obtained through an operation using the seed value as an exponent or a multiplier.

Figure 13:
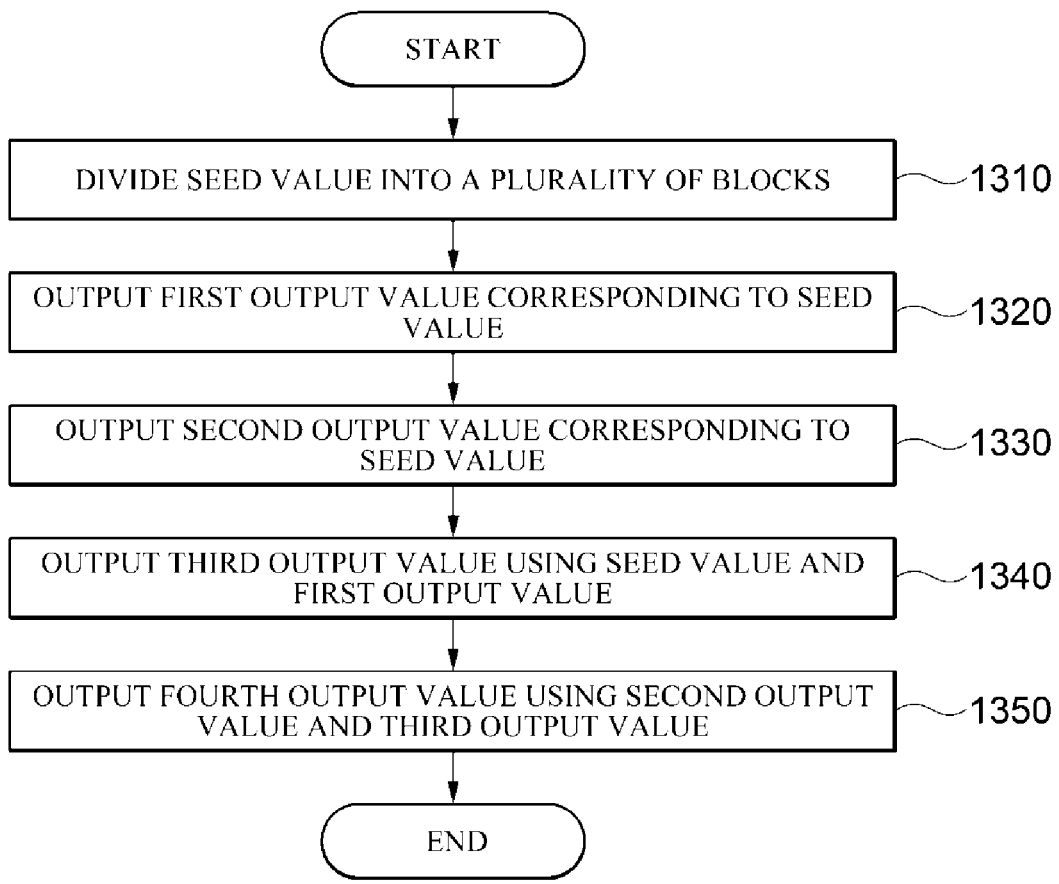
FIG. 13 is a flowchart illustrating a method of performing an operation according to another embodiment of the present disclosure.

FIG. 13 is a flowchart illustrating a method of performing an operation according to another embodiment of the present disclosure.

The method shown in FIG. 13 may be performed by, for example, the apparatus 900 illustrated in FIG. 9.

Referring to FIG. 13, the apparatus 900 divides a seed value into a plurality of blocks (1310).

Specifically, according to one embodiment of the present disclosure, the apparatus 900 may generate a plurality of blocks by dividing the seed value by a predetermined size and the number of blocks generated may be changed according to an embodiment.

Then, the apparatus 900 outputs a first output value corresponding to the seed value using a first parameter candidate value set (1320).

Specifically, according to one embodiment of the present disclosure, the apparatus 900 extract a plurality of first parameter candidate values respectively corresponding to the plurality of blocks divided from the seed value, from a first parameter candidate value set and generate a first output value using the plurality of extracted first parameter candidate values. In this case, the apparatus 900 may generate the first output value by adding the plurality of extracted first parameter candidate values to each other.

Then, the apparatus 900 outputs a second output value corresponding to the seed value using a second parameter candidate value set (1330).

In this case, according to one embodiment of the present disclosure, second parameter candidate values included in the second parameter candidate value set may have values equal to values obtained through an operation using each of the first parameter candidate values included in the first parameter candidate value set as an exponent or a multiplier.

Meanwhile, according to one embodiment of the present disclosure, the apparatus 900 may extract a plurality of second parameter candidate values respectively corresponding to the plurality of blocks divided from the seed value, from the second parameter candidate value set and output the second output value using the plurality of extracted second parameter candidate values. In this case, the apparatus 900 may generate the second output value by adding or multiplying the plurality of extracted second parameter candidate values with each other and the second output value may be equal to a value obtained through an operation using the first output value as an exponent or a multiplier.

Then, the apparatus 900 outputs a third output value using the seed value and the first output value (1340).

Specifically, the apparatus 900 may generate the third output value through, for example, addition or subtraction using the seed value and the first output value. In this case, the third output value may be generated using a one-way function in various forms, as well as the aforementioned addition or subtraction.

Then, the apparatus 900 outputs a fourth output value using the second output value and the third output value (1350).

In this case, according to one embodiment of the present disclosure, the apparatus 900 may generate the fourth output value using, for example, a one-way function in various forms and the fourth output value may be equal to a value obtained through an operation using the seed value as an exponent or a multiplier.

While the flowcharts shown in FIGS. 12 and 13 illustrates the method as being performed in a plurality of operations, at least some of the operations may be performed in a different order, performed in combination with each other, omitted, performed in sub-operations, or performed with at least one operation that is not illustrated being added thereto.

Figure 14:
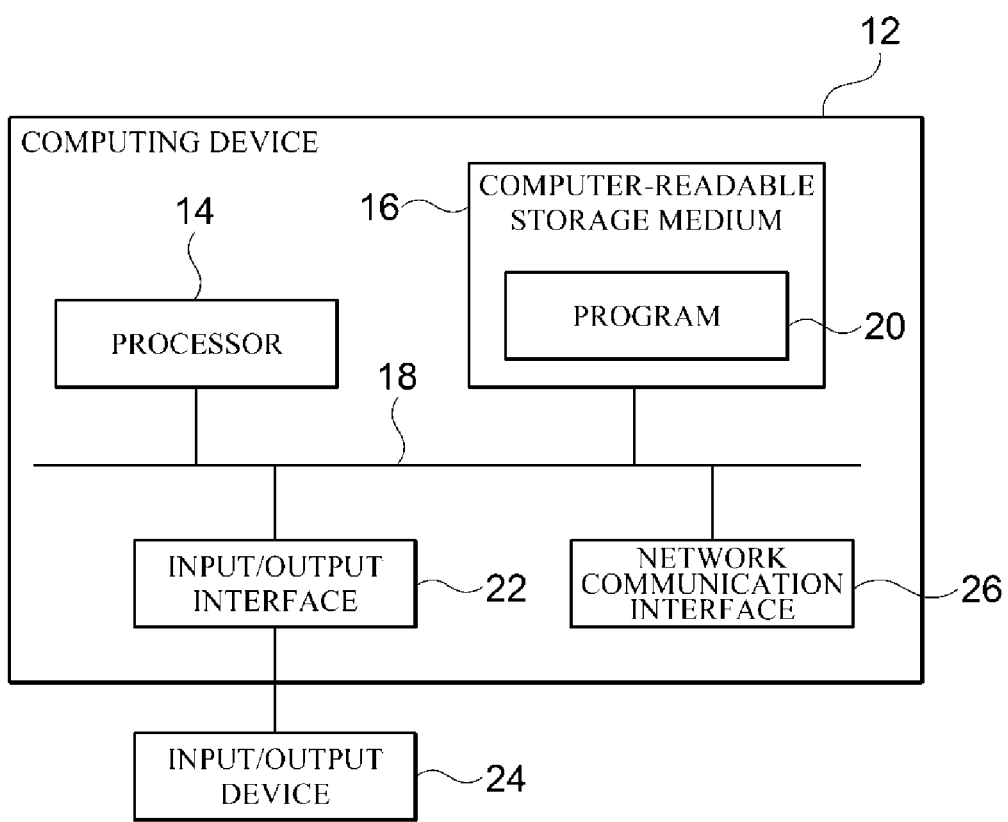
FIG. 14 is a block diagram for describing a computing environment including a computing device suitable to use in illustrative embodiments.

FIG. 14 is a block diagram for describing a computing environment including a computing device suitable to use in illustrative embodiments. In the illustrated embodiment, each of the components may have functions and capabilities different from those described hereinafter and additional components may be included in addition to the components described herein.

The illustrated computing environment 1 includes a computing device 12. In one embodiment, the computing device 12 may be one or more components included in an apparatus 100 and 900 for performing an operation.

The computing device 12 includes at least one processor 14, a computer-readable storage medium 16, and a communication bus 18. The processor 14 may enable the computing device 12 to operate according to the aforementioned exemplary embodiments. For example, the processor 14 may execute one or more programs stored in the computer-readable storage medium 16. The one or more programs may include one or more computer executable commands, and the computer executable commands may be configured to cause the computing device 12 to perform operations according to the illustrative embodiment when executed by the processor 14.

The computer-readable storage medium 16 is configured to store computer executable commands and program codes, program data and/or information in other suitable forms. The programs stored in the computer readable storage medium 16 may include a set of commands executable by the processor 14. In one embodiment, the computer readable storage medium 16 may be a memory (volatile memory, such as random access memory (RAM), non-volatile memory, or a combination thereof), one or more magnetic disk storage devices, optical disk storage devices, flash memory devices, storage media in other forms capable of being accessed by the computing device 12 and storing desired information, or a combination thereof.

The communication bus 18 interconnects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to the embodiments of the present disclosure, it is possible to generate a value equal to a value derived through an operation using a seed value as an exponent or a multiplier by using previously generated parameter value sets and a simple operation secure against side-channel attack. Accordingly, it is possible to improve security against side-channel attack without degrading performance, and at the same time satisfy an operation test required for certification, such as Federal Information Processing Standards (FIPS) certification, by a standard certification authority.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for performing an operation, comprising: one or more hardware processors configured to implement:
a first outputter configured to output a first output value corresponding to a seed value using a first parameter candidate value set;
a second outputter configured to output a second output value using a second parameter candidate value set wherein the second output value corresponds to the seed value and is capable of being generated using the first output value;
a third outputter configured to output a third output value through a first one-way function using the seed value and the first output value; and
a fourth outputter configured to output a fourth output value through a second one-way function using the second output value and the third output value, wherein the fourth output value is equal to a value generated through an operation using the seed value as an exponent or a multiplier,
wherein the first outputter extracts one or more first parameter candidate values corresponding to the seed value from the first parameter candidate value set and generates the first output value using the extracted first parameter candidate values and the second outputter extracts one or more second parameter candidate values corresponding to the seed value from the second parameter candidate value set and generates the second output value using the extracted second parameter candidate values.

2. The apparatus of claim 1, wherein the second output value has a value equal to a value obtained through an operation using the first output value as an exponent or a multiplier.

3. The apparatus of claim 1, wherein the second parameter candidate value set includes a plurality of second parameter candidate values equal to values obtained through an operation using each of the first parameter candidate values included in the first parameter candidate value set as an exponent or a multiplier.

4. The apparatus of claim 1, wherein the extracted second parameter candidate values have values equal to values generated through an operation using each of the extracted first parameter candidate values as an exponent or a multiplier.

5. The apparatus of claim 1, further comprising a divider configured to divide the seed value into a plurality of blocks, wherein the first outputter extracts a plurality of first parameter candidate values corresponding to the plurality of blocks from the first parameter candidate value set and the second outputter extracts a plurality of second parameter candidate values corresponding to the plurality of blocks from the second parameter candidate value set.

6. The apparatus of claim 1, further comprising an encryptor configured to perform at least one of digital signature generation, encryption, and encryption key generation using the seed value and the fourth output value.

7. A method of performing an operation, comprising:
outputting a first output value corresponding to a seed value using a first parameter candidate value set;
outputting a second output value using a second parameter candidate value set wherein the second output value corresponds to the seed value and is capable of being generated using the first output value;
outputting a third output value using a first one-way function from the seed value and the first output value; and
outputting a fourth output value through a second one-way function using the second output value and the third output value, wherein the fourth output value is equal to a value generated through an operation using the seed value as an exponent or a multiplier,
wherein the outputting of the first output value comprises extracting one or more first parameter candidate values corresponding to the seed value from the first parameter candidate value set and generating the first output value using the extracted first parameter candidate values and the outputting of the second output value comprises extracting one or more second parameter candidate values corresponding to the seed value from the second parameter candidate value set and generating the second output value using the extracted second parameter candidate values.

8. The method of claim 7, wherein the second output value has a value equal to a value obtained through an operation using the first output value as an exponent or a multiplier.

9. The method of claim 7, wherein the second parameter candidate value set includes a plurality of second parameter candidate values equal to values obtained through an operation using each of the first parameter candidate values included in the first parameter candidate value set as an exponent or a multiplier.

10. The method of claim 7, wherein the extracted second parameter candidate values have values equal to values generated through an operation using each of the extracted first parameter candidate values as an exponent or a multiplier.

11. The method of claim 7, further comprising dividing the seed value into a plurality of blocks,
wherein the extracting of the first parameter candidate values comprises extracting a plurality of first parameter candidate values corresponding to the plurality of blocks from the first parameter candidate value set and the extracting of the second parameter candidate values comprises extracting a plurality of second parameter candidate values corresponding to the plurality of blocks from the second parameter candidate value set.

12. The method of claim 7, further comprising performing at least one of digital signature generation, encryption, and encryption key generation using the seed value and the fourth output value.

* * * * *